(12) United States Patent
Hartog et al.

(10) Patent No.: US 9,170,149 B2
(45) Date of Patent: Oct. 27, 2015

(54) DISTRIBUTED FIBER OPTIC SENSOR SYSTEM WITH IMPROVED LINEARITY

(75) Inventors: Arthur Hartog, Winchester (GB); Kamal Kader, Tokyo (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 1004 days.

(21) Appl. No.: 13/221,280

(22) Filed: Aug. 30, 2011

(65) Prior Publication Data

US 2012/0067118 A1    Mar. 22, 2012

Related U.S. Application Data

(60) Provisional application No. 61/379,192, filed on Sep. 1, 2010.

(51) Int. Cl.
| | |
|---|---|
| *G01J 1/42* | (2006.01) |
| *G01H 9/00* | (2006.01) |
| *G02F 1/295* | (2006.01) |
| *G02B 6/10* | (2006.01) |
| *G02B 26/10* | (2006.01) |

(Continued)

(52) U.S. Cl.
CPC ............... *G01H 9/004* (2013.01); *E21B 41/00* (2013.01); *G01D 5/35361* (2013.01); *G01L 1/242* (2013.01); *G01M 11/083* (2013.01); *G02B 6/10* (2013.01); *G02B 26/103* (2013.01); *G02F 1/295* (2013.01); *G02F 1/2955* (2013.01)

(58) Field of Classification Search
CPC .... G01H 9/004; G01D 5/35361; G01L 1/242; G01M 11/083; G02B 6/10; G02B 26/103; E21B 41/00

USPC ............ 250/227.14, 227.15, 227.16, 227.19; 385/1, 13

See application file for complete search history.

(56) References Cited

U.S. PATENT DOCUMENTS

| | | | |
|---|---|---|---|
| 5,194,847 | A | 3/1993 | Taylor et al. |
| 7,652,245 | B2 | 1/2010 | Crickmore et al. |

(Continued)

FOREIGN PATENT DOCUMENTS

| | | |
|---|---|---|
| GB | 2222247 A | 2/1990 |
| GB | 2442745 A | 4/2008 |

(Continued)

OTHER PUBLICATIONS

M.K. Barnoski, and S.M. Jensen, Fiber waveguides: a novel technique for investigating attenuation characteristics. Applied Optics 15 (1976) 2112-5.

(Continued)

*Primary Examiner* — Georgia Y Epps
*Assistant Examiner* — Kevin Wyatt
(74) *Attorney, Agent, or Firm* — David J. Groesbeck

(57) ABSTRACT

A fiber optic sensor system includes an optical source to output a first optical signal to launch into an optical fiber, and a coherent detector to mix a coherent Rayleigh backscatter signal generated by the optical fiber in response to the first optical signal with a second optical signal output by the optical source and to generate a mixed output signal. A phase detection and acquisition system determines a phase difference between first and second locations along the optical fiber based on phase information extracted from the mixed output signal and combines the phase information extracted from multiple acquisitions to detect strain on the optical fiber sensor.

28 Claims, 9 Drawing Sheets

(51) Int. Cl.
*E21B 41/00* (2006.01)
*G01D 5/353* (2006.01)
*G01L 1/24* (2006.01)
*G01M 11/08* (2006.01)

(56) References Cited

U.S. PATENT DOCUMENTS

| | | | |
|---|---|---|---|
| 7,668,411 B2* | 2/2010 | Davies et al. | 385/12 |
| 7,764,373 B2 | 7/2010 | Fujii et al. | |
| 7,872,736 B2* | 1/2011 | Rogers et al. | 356/73.1 |
| 9,002,149 B2* | 4/2015 | Rogers | 385/12 |
| 2004/0240769 A1 | 12/2004 | Spirin et al. | |
| 2009/0008536 A1 | 1/2009 | Hartog et al. | |
| 2011/0320147 A1* | 12/2011 | Brady et al. | 702/66 |

FOREIGN PATENT DOCUMENTS

| | | |
|---|---|---|
| WO | 9830881 A1 | 7/1998 |
| WO | 2006/048647 A2 | 5/2006 |
| WO | 2010/020781 A1 | 2/2010 |
| WO | 2010/020795 A1 | 2/2010 |
| WO | 2010/020796 A1 | 2/2010 |
| WO | 2010/055293 A1 | 5/2010 |
| WO | 2010/090660 A1 | 8/2010 |
| WO | 2010/136764 A2 | 12/2010 |
| WO | 2010/136768 A2 | 12/2010 |
| WO | 2010/136773 A2 | 12/2010 |
| WO | 2010/136809 A2 | 12/2010 |
| WO | 2010/136810 A2 | 12/2010 |
| WO | 2011/039501 A2 | 4/2011 |
| WO | 2011/058312 A2 | 5/2011 |
| WO | 2011/058322 A2 | 5/2011 |
| WO | 2011/067554 A1 | 6/2011 |

OTHER PUBLICATIONS

M. Gold, Design of a long-range single-mode OTDR. Lightwave Technology, Journal of 3 (1985) 39-46.

B.L. Danielson, Optical time-domain reflectometer specifications and performance testing. Applied Optics 24 (1985) 2313-2322.

J. King, D. Smith, K. Richards, P. Timson, R. Epworth, and S. Wright, Development of a coherent OTDR instrument. Lightwave Technology, Journal of 5 (1987) 616-624.

E. Bodtker, B. Tromborg, J. Mark, and S.J. Nielsen, Heterodyne OTDR at 0.82um. Electronics Letters 19 (1983) 361-2.

P. Healey, and D.J. Malyon,OTDR in single mode fibre at 1.55um using heterodyne detection. Electronics Letters 28 (1982) 862-3.

H. Izumita, S.I. Furukawa, Y. Koyamada, and I. Sankawa, Fading noise reduction in coherent OTDR. Photonics Technology Letters, IEEE 4 (1992) 201-203.

J.C. Juarez, and H.F. Taylor, Polarization discrimination in a phase-sensitive optical time-domain reflectometer intrusion-sensor system. Optics Letters 30 (2005) 3284-6.

J.C. Juarez, and H.F. Taylor,Field test of a distributed fiber-optic intrusion sensor system for long perimeters. Applied Optics 46 (2007) 1968-71.

R. Juskaitis, A.M. Mamedov, V.T. Potapov, and S.V. Shatalin, Distributed interferometric fiber sensor system. Optics Letters 17 (1992) 1623-5.

R. Juskaitis, A.M. Mamedov, V.T. Potapov, and S.V. Shatalin, Interferometry with Rayleigh backscattering in a single-mode optical fiber. Optics Letters 19 (1994) 225.

S.V. Shatalin, V.N. Treshikov, and A.J. Rogers, Interferometric optical time-domain reflectometry for distributed optical-fiber sensing. Applied Optics 37 (1998) 5600-4.

R.J. Posey, G.A. Johnson, and S.T. Vohra, Strain sensing based on coherent Rayleigh scattering in an optical fibre. Electronics Letters 36 (2000) 1688-89.

R.J. Posey, G.A. Johnson, and S.T. Vohra, Rayleigh Scattering Based Distributed Sensing System for Structural Monitoring, 14th Conference on Optical Fibre Sensors, Venice, Italy, 2001, pp. 678-681.

A.H. Hartog, and M.P. Gold, On the theory of backscattering in single-mode optical fibers. Lightwave Technology, Journal of 2 (1984) 76-82.

K.I. Nakagawa, M. Kourogi, and M. Ohtsu, Frequency noise reduction of a diode laser by using the FM sideband technique. Optics Letters 17 (1992) 934-936.

S.K. Sheem, Optical fiber interferometers with [3×3] directional couplers: Analysis. Journal of Applied Physics 52 (1981) 3865-3872.

L. Mertz, Complex interferometry. Appl. Opt. 22 (1983) 1530-1534.

J. Pietzsch, Scattering matrix analysis of 3×3 fiber couplers. Lightwave Technology, Journal of 7 (1989) 303-307.

H.M. Xie, P. Dabkiewicz, R. Ulrich, and K. Okamoto, Side-hole fiber for fiber-optic pressure sensing. Optics Letters 11 (1986) 333-5.

M. Varnham, D. Payne, A. Barlow, and R. Birch, Analytic solution for the birefringence produced by thermal stress in polarization-maintaining optical fibers. Lightwave Technology, Journal of 1 (1983) 332-339.

Molenaar, M., et al., First downhole application of distributed acoustic sensing (DAS) for hydraulic fracturing monitoring and diagnostics, in SPE Hydraulic Fracturing Technology Conference and Exhibition. 2011, SPE: The Woodlands, Texas, USA.

Mestayer, J., Field Trials of Distributed Acoustic Sensing for Geohpsyical Monitoring SEG 2011 annual meeting San Antonio, TX Sep. 2011, p. 4253-7.

International Search Report and Written Opinion of PCT Application No. PCT/US2011/049720 dated Apr. 10, 2012.

* cited by examiner

DISTRIBUTED FIBER OPTIC SENSOR SYSTEM WITH IMPROVED LINEARITY

This application claims the benefit of U.S. Provisional Application Ser. No. 61/379,192, entitled "Distributed Vibration Sensor With Improved Linearity," filed on Sep. 1, 2010, which is incorporated herein by reference in its entirety.

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. One piece of equipment which may be installed is a sensing system, such as a fiber optic based distributed sensing system.

To measure vibration or strain, distributed fiber optic sensing systems typically measure the amplitude of Rayleigh backscatter returned from the fiber optic sensor when excited by a narrow band optical source. This signal, while useful for detecting events, has a strain-optical signal transfer function that is both highly non-linear and unpredictable. Although useful results can be achieved using this technique, including tracking the movement of certain events and classifying various types of disturbances, the non-linear and unpredictable characteristics of the system can impede accurate classification of events and the use of the system for quantitative measurements.

BRIEF DESCRIPTION OF THE DRAWINGS

Certain embodiments of the invention are described with reference to the accompanying drawings, wherein like reference numerals denote like elements. It should be understood, however, that the accompanying drawings illustrate only the various implementations described herein and are not meant to limit the scope of various technologies described herein. The drawings show and describe various embodiments of the current invention.

DETAILED DESCRIPTION

Figure 1:
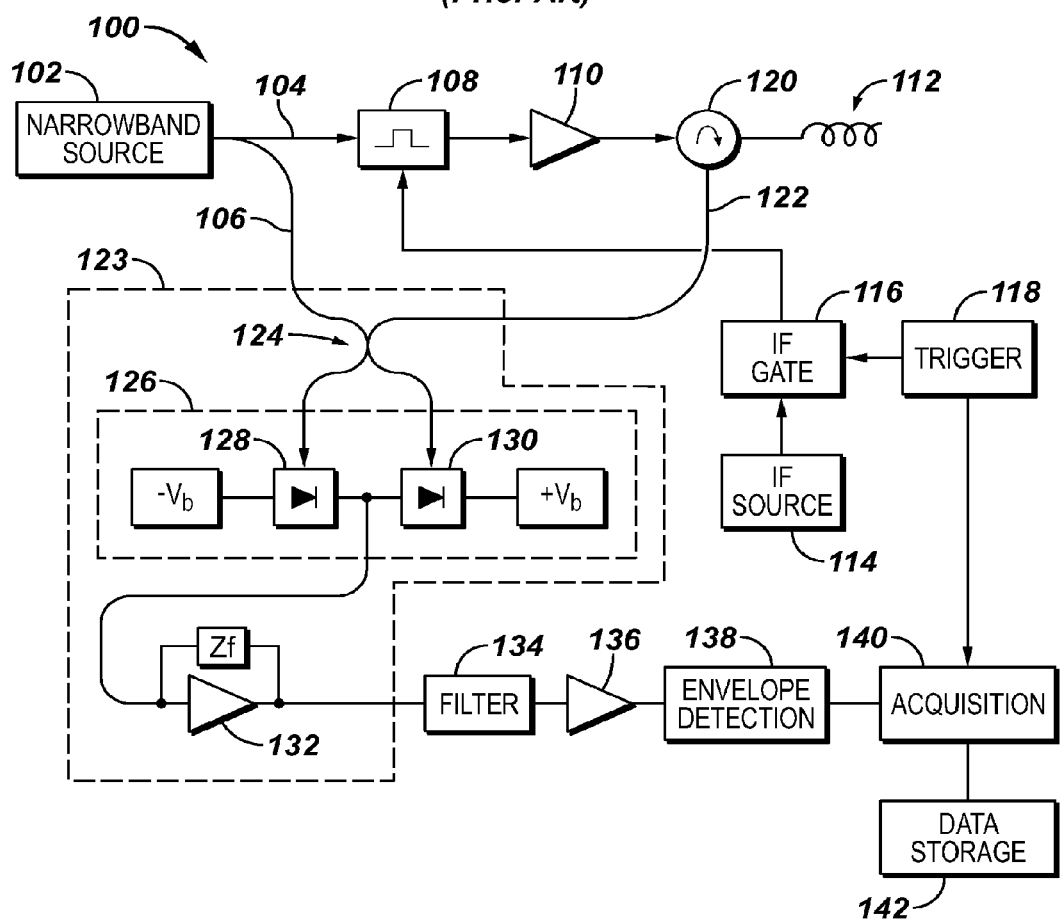
FIG. 1 is a schematic illustration of a prior art amplitude coherent-detection OTDR system.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Various embodiments of the invention comprise methods and apparatus that combine the use of coherent detection and phase-sensitive measurements in an optical time-domain reflectometry (OTDR) system to detect, classify and/or provide a quantitative measurement of time-dependent changes in a parameter, such as strain, along the length of the sensing fiber. By using coherent detection techniques where a frequency difference exists between the optical signal launched into the sensing fiber and a local oscillator signal, an intermediate-frequency (IF) waveform can be recorded and the phase, as well as the amplitude, of the coherent backscatter signal can be measured. While the phase per se is as capricious a parameter as the amplitude, the phase-difference between two regions of the sensing fiber can be used to estimate changes in strain along the fiber.

In some embodiments of the invention, there is no frequency shift or difference between the launched optical signal and the local oscillator signal so that the IF frequency is zero. This type of coherent detection arrangement is referred to as homodyne detection. In this case, the OTDR system requires further information to determine phase. This information may be acquired, for example, by obtaining two output signals that are in quadrature in order to allow the phase of the backscatter signal to be calculated unambiguously.

In general, coherent OTDR involves launching a short pulse of light into an optical fiber and observing the resulting returned light (the backscatter signal). The backscatter signal comprises light that has been scattered from inhomogeneities in the fiber and then re-captured by the guiding structure of the fiber in the return direction. The vast majority of this signal arises from interaction of the probe pulse with subwavelength-scale scattering centers (i.e., fluctuations in the refractive index about the mean value) in the glass forming the fiber. The scattering centers are caused by thermodynamically driven variations in composition or density that are frozen into the glass at the time of drawing the fiber. Because these scattering centers are nominally fixed, the resulting scattered light is at essentially the same frequency as the incident light. Other scattering mechanisms, such as Raman and Brillouin scattering, are caused by interaction with molecular or lattice vibrations. However, because these types of scattering occur at a different frequency from the incident light, they can be eliminated by filtering and are in any case very weak. Consequently, the Rayleigh backscatter, which occurs at essentially the same frequency as the light that is incident on the fiber, can be the primary mechanism which is used to obtain measurements with the fiber and is the mechanism that is employed by the apparatus and techniques described herein.

Conventionally, OTDR is performed with a relatively broadband source in order to eliminate the coherent effects that embodiments of the invention described herein exploit, as will be explained in further detail below. In a conventional OTDR, the spectral width of the optical source ensures a short coherence length, and a single resolution cell (i.e., the length of fiber occupied by the probe pulse at any instant while it is traveling in the fiber) is many times longer than the source coherence length. As a result, the backscatter signals from each part of the resolution cell add incoherently. That is, the intensity of the backscatter signals recorded by the detector for a particular resolution cell is the sum of the intensities for each sub-section of that cell (where a sub-section is equal to or longer than a source coherence length). Thus, in conventional OTDR, it is assumed, explicitly or otherwise, that the optical source is incoherent.

However, when OTDR measurements are carried out with a narrowband source (such that its coherence length is of order a pulse duration or, prior to modulation, much longer than a pulse width), then the phase of the backscatter from each part of the resolution cell is correlated with the phase of the backscatter from the other parts. Embodiments of the invention make use of this property.

More particularly, the scattering process may be viewed as a re-radiation of a small fraction of the probe light at many scattering centers (or scatterers), each located randomly within the glass and each having a defined amplitude and phase relationship with the probe light. Since the probe pulse from a narrowband optical source is highly coherent, each scatterer has a fixed phase relationship with the other scatterers within the pulse width. A fraction of the light thus scattered is re-captured by the waveguide in the return direction. The returned light consists of the summation of the electric fields of this multitude of scatterers, attenuated by the return travel through the fiber. In a direct-detection OTDR system, this light is directed to a detector (e.g. a photodiode) and converted to an electrical signal. The conversion process converts optical power to electrical current and thus involves squaring the electric field (strictly multiplying the electric field by its complex conjugate). As a result, the signal is sensitive to the relative phase of the contributions from each scattering element. Ignoring polarization effects temporarily, the electric field from each scatterer can be viewed as a phasor, i.e. a vector having length (amplitude) and angle (phase). When all the electric fields from the scatterers within one resolution cell thus sum at the detector, a vector summation will be carried out implicitly by the detector. Thus, if the scatterers are by-and-large in phase, then a strong signal current will be generated by the detector. If the phasors happen on average to cancel out (e.g. a similar number having a negative as a positive phase), then the signal from the detector will be weak.

The backscatter signal from a coherent OTDR thus takes on a jagged appearance since, for each resolution cell, the coherent summation can be constructive or destructive. However, provided that the source frequency is stable, then so too is the backscatter signal.

Generally, in a direct-detection OTDR system, if the backscattered light is sent directly to a detector, the phase information is lost and the signal relates purely to the vector summed amplitude. However, when the backscatter return is mixed with strong light directly from the optical source (referred to as the local oscillator or LO), then the backscatter signal and the LO signal combine at the detector to provide a difference-frequency that retains both the amplitude and phase information of the backscatter signal, provided the local oscillator is of constant intensity and sufficiently narrowband to ensure a predictable phase output. Such an arrangement is referred to as a coherent-detection OTDR system. If the local oscillator and backscatter signals are at a different carrier frequency (the difference between their carrier frequencies being referred to as the intermediate frequency, or IF), then the arrangement is referred to as a heterodyne OTDR system. The signal emerging from the detector takes the form of a sine wave at the IF, with amplitude modulation and phase modulation. The amplitude of this signal may be mapped directly into a signal equivalent to that provided by a direct-detection coherent OTDR and can be obtained, for example, by passing the IF signal through an electrical detector (such as a rectifier) and then low-pass filtering the output. An exemplary implementation of this type of coherent-detection OTDR arrangement which acquires only the amplitude information is depicted in the prior art system of FIG. 1.

As shown in FIG. 1, a coherent-detection OTDR system 100 that measures the intensity (i.e., amplitude) of the backscatter signals includes an optical source 102, which is a narrowband laser, such as a fiber distributed feedback laser. The output of the source 102 is divided into a local oscillator path 106 and another path 104. In path 104, a modulator 108 modulates the optical signal into a probe pulse, which additionally may be amplified by amplifier 110 prior to being launched into a sensing fiber 112. For a heterodyne OTDR system, the probe pulse and the local oscillator signal are at different carrier frequencies. In the embodiment shown in FIG. 1, a frequency shift is introduced in the probe pulse, which may be achieved, for instance, by selecting the modulator 108 to be of the acousto-optic type, where the pulsed output is taken from the first diffraction order, or higher. All orders other than zero of the output of such devices are frequency-shifted (up or down) with respect to the input light by an amount equal to (for first order) or integer multiple of (for second order or higher) the radio-frequency electrical input applied to them. Thus, as shown in FIG. 1, an IF source 114 (e.g., a radio frequency oscillator) provides a driving signal for the modulator 108, gated by an IF gate 116 under the control of a trigger pulse 118. The optical pulse thus extracted from the modulator 108 is thus also frequency-shifted relative to the light input to the modulator 108 from the optical source 102, and therefore also relative to the local oscillator signal in the path 106.

The trigger 118 shown in FIG. 1 synchronizes the generation of the probe pulse with the acquisition by system 140 of samples of the amplitude information obtained from the backscatter signal generated by the sensor 112. In various embodiments, the trigger 118 can be implemented as a counter within the acquisition system 140 that determines the time at which the next pulse should be generated by modulator 108. At the determined time, the trigger 118 causes the IF gate 116 to open simultaneously with initiating acquisition by the system 140 of a pre-determined number of samples of the amplitude information. In other embodiments, the trigger 118 can be implemented as a separate element that triggers initiation of the probe pulse and acquisition of the samples in a time-linked manner. For instance, the trigger 118 can be implemented as an arbitrary waveform generator that has its clock locked to the clock of the acquisition system 140 and which generates a short burst at the IF rather than the arrangement shown of an RF source 114 followed by a gate 116.

In other arrangements, the frequency difference between the probe pulse launched into the fiber 112 and the local oscillator signal in the path 106 may be implemented in manners other than by using the modulator 108 to shift the frequency of the probe pulse. For instance, a frequency shift may be achieved by using a non-frequency-shifting modulator in the probe pulse path 104 and then frequency-shifting (up or down) the light prior to or after the modulator. Alternatively, the frequency shifting may be implemented in the local oscillator path 106.

Returning to the embodiment shown in FIG. 1, a circulator 120 passes the probe pulse into the sensing fiber 112 and diverts the returned light to a lower path 122, where it is directed to a coherent-detection system 123 that generates a mixed output signal. In an exemplary implementation, the coherent-detection system 123 includes a directional coupler 124, a detector 126 and a receiver 132. The directional coupler 124 combines the returned light in path 122 with the local oscillator light in the path 106. The output of the coupler 124 is directed to the detector 126. In the embodiment shown, the detector 126 is implemented as a pair of detectors 128 and 130 that are arranged in a balanced configuration. The use of a detector pair can be particularly useful because it makes better use of the available light and can cancel the light common to both outputs of the coupler 124 and, in particular, common-mode noise. The detector 126, or detector pair, provide(s) a current output centered at the IF that is passed to the receiver 132, such as a current input preamplifier or the transimpedance amplifier shown in FIG. 1, which provides the mixed output signal (e.g., the IF signal). A filter 134 can be used to select a band of frequencies around the IF and the filtered signal can then be amplified by amplifier 136 and sent to a circuit 138 that detects the envelope of the IF. The output of circuit 138 is provided to an acquisition system 140 that is configured to sample the incoming signal to acquire the amplitude information therefrom. As described above, the trigger 118 time synchronizes the sampling of the incoming signal with the generation of the probe pulse.

The acquisition system 140 may include a suitable processor (e.g., general purpose processor, microcontroller) and associated memory device for performing processing functions, such as normalization of the acquired data, data averaging, storage in a data storage 142, and/or display to a user or operator of the system. In some embodiments, the acquisition system 140 may include an analog-to-digital converter to digitize the signal and the amplitude information then can be acquired from the digital data stream.

As described so far, the benefit of heterodyne detection is the improved signal-to-noise ratio that can be obtained from the heterodyne process and also an improvement in the dynamic range since the heterodyne signal is proportional to the square root of the backscatter intensity (rather than being linearly related to that signal). The heterodyne (or more generally the coherent detection) process generally improves the signal-to-noise ratio, because the electrical signal that is detected is proportional to the square root of the LO power. The latter can, in principle, be made arbitrarily large and thus the electrical signal presented to the preamplifier can be arranged to be much larger than the preamplifier noise. The LO is accompanied by its own noise and once this noise source is significantly greater than the noise of the receiver, the signal-to-noise ratio is within a factor of 2 of the ultimate shot noise limit which is determined by the number of signal photons arriving. As a result, this implementation approaches the characteristics of a perfect detector. However, when extracting only the amplitude information, the strain-optical signal transfer function is highly non-linear and unpredictable.

Accordingly, embodiments of the invention improve the linearity of the detection system by using the phase information that is available in a coherent-detection OTDR system but which previously has not been extracted for use to measure a parameter, such as strain, that is incident on the optical fiber sensor. The phase of the scattered signal from a given region of optical fiber is a result of the summation of the electric field phasor of each scatterer, just like the electric field amplitude for that region. The phase is stable provided the frequency of the optical source is stable and the fiber is not disturbed in that region. Therefore if, between the two regions of undisturbed fiber, the fiber is strained, the phase-difference between these two regions will respond linearly to the applied strain. To measure this phase-difference, embodiments of the invention employ a coherent-detection OTDR system (e.g., either a heterodyne or homodyne OTDR system) to extract phase information from the backscatter signal.

Figure 2:
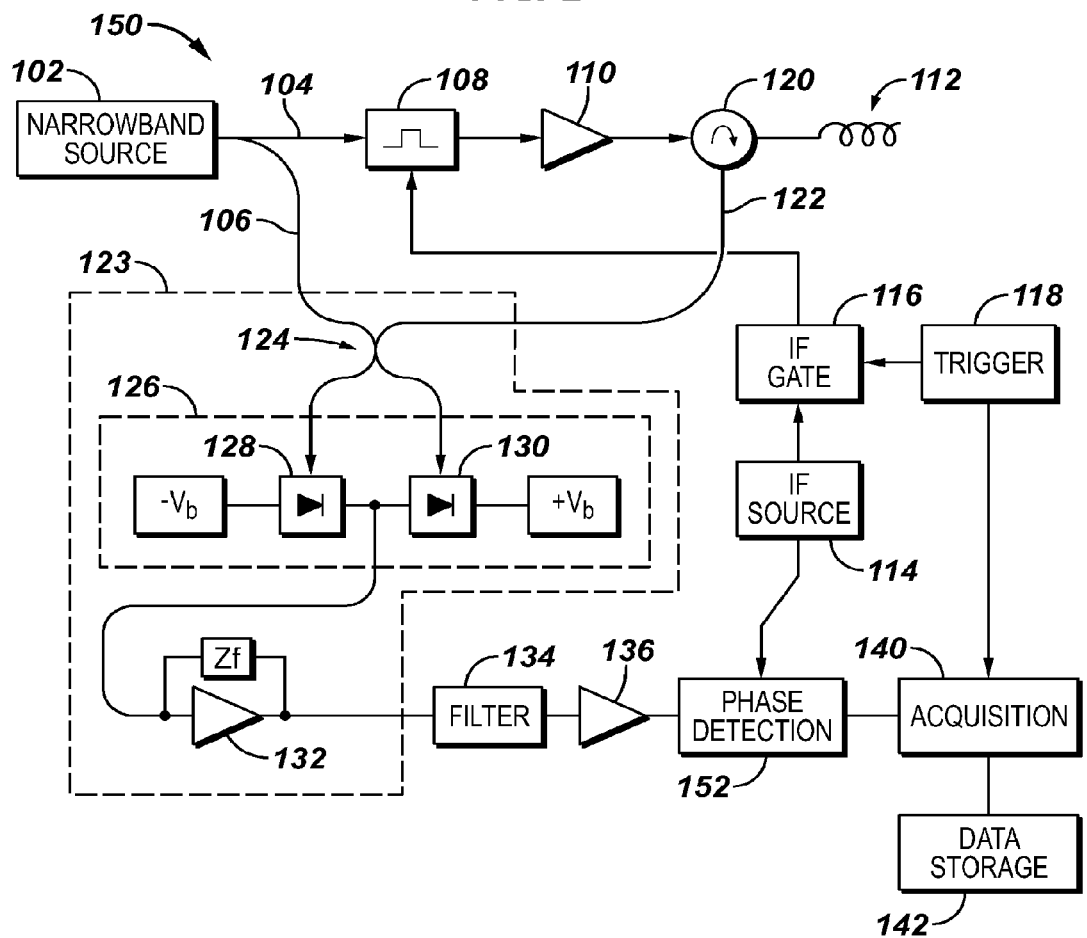
FIG. 2 is a schematic illustration of an exemplary phase coherent-detection OTDR system, in accordance with an embodiment.

An example of a phase-measuring coherent-detection OTDR system 150 is shown in FIG. 2, which includes a phase-detection circuit 152 that detects the phase of the mixed output signal (e.g., the IF signal) generated by the coherent-detection system 123 relative to an external reference, e.g., IF source 114. The phase-detection circuit 152 for extracting the phase of the mixed output signal can be implemented by a variety of commercially available devices, such as the AD8302, supplied by Analog Devices (of Norwood, Mass., USA). In the embodiment shown in FIG. 2, the IF source 114 (which generates the driving signal used to shift the relative frequencies of the LO and the backscatter signals by a known amount, which is related to the frequency of the driving signal) is also fed to the phase-detection circuit 152 to provide a reference. Thus, the phase-detector 152 provides an output that is proportional (modulo 360°) to the phase-difference between the backscatter signal (mixed down to IF) and the reference from the IF source 114.

In general, the technique described above for detecting phase in the backscatter signal, such as for measuring changes in local strain along the length of the sensing fiber, can be summarized as follows. The optical output of a highly-coherent optical source (e.g., source 102) is divided between two paths (e.g., paths 104 and 106). The carrier frequency of the signal in one or both of the paths may be frequency shifted to ensure that the carrier frequencies of the optical signals in the two paths differ by a known amount. In some embodiments, as will be explained below, frequency-shifting is not employed so that the difference in frequency is zero.

Regardless of whether frequency-shifting is employed, the signal in the first path (e.g., path 104) is modulated to form a pulse, which optionally may be amplified. The pulse is then launched into the sensing fiber (e.g., fiber 112), which generates a backscatter signal in response to the pulse. The backscatter return is separated from the forward-travelling light and then mixed with the light in the second path (e.g., path 106) onto at least one photodetector to form a mixed output signal, such as an intermediate frequency (IF) signal. In embodiments in which there is no frequency shift, this IF is at zero frequency. Based on a known speed of light in the sensing fiber, the phase of the IF at selected locations along the fiber can be extracted and measured. The difference in phase between locations separated by at least one pre-defined distance interval along the fiber is calculated. As an example, the phase may be measured at locations every meter along the fiber and the phase difference may be determined between locations separated by a ten meter interval, such as between all possible pairs of locations separated by ten meters, a subset of all possible pairs of locations separated by ten meters, etc. Finally, at least one more optical pulse is launched into the sensing fiber, phase information at locations along the fiber is extracted from the resultant mixed output signal (created by mixing the backscatter signal with the light in the second path), and the phase differences between locations are determined. A comparison is then performed of the phase differences as a function of distance (obtained based on the known speed of light) along the fiber for at least two such probe pulses. The results of this comparison can provide an indication and a quantitative measurement of changes in strain at known locations along the fiber.

Although the foregoing discussion has described the cause of changes in the phase-difference of the backscatter signal as being strain incident on the optical fiber, other parameters, such as temperature changes, also have the ability to affect the differential phase between sections of the fiber. With respect to temperature, the effect of temperature on the fiber is generally slow and can be eliminated from the measurements, if desired, by high-pass filtering the processed signals. Furthermore, the strain on the fiber can result from other external effects than those discussed above. For instance, an isostatic pressure change within the fiber can result in strain on the fiber, such as by pressure-to-strain conversion by the fiber coating.

Regardless of the source of the change in phase differentials, phase detection may be implemented in a variety of manners. In some embodiments, the phase detection may be carried out using analog signal processing techniques as described above or by digitizing the IF signal and extracting the phase from the digitized signal.

Figure 3:
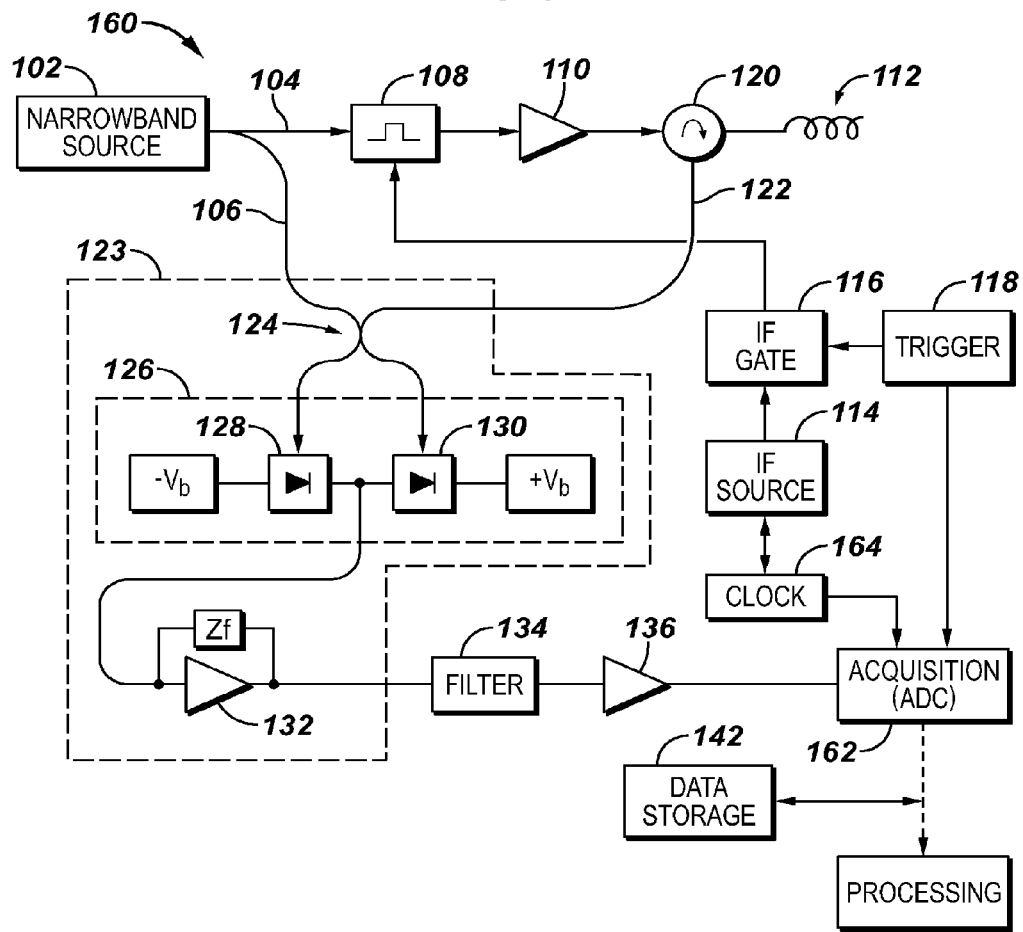
FIG. 3 is a schematic illustration of another exemplary phase coherent-detection OTDR system in accordance with an embodiment.

For instance, FIG. 3 shows an embodiment for a phase-measuring coherent-detection OTDR system 160 that uses digital signal acquisition techniques. Compared with the system 150 of FIG. 2, the phase detector circuit 152 is replaced by a high-speed analog-to-digital converter (ADC) 162 driven by a clock 164 and triggered by the same trigger source 118 that is used to initiate the optical probe pulse. The clock 164, which controls the sampling rate of the ADC 162, can be derived from the same master oscillator that is used to derive the IF source 114 in order to ensure phase coherence between the backscatter signal and the timing of the digital samples.

As an example, commercially available acousto-optic modulator drive frequencies include 40, 80 or 110 MHz. The resulting IF signal can conveniently be sampled at 250 Msample/s, a sampling frequency for which a number of high quality 12-bit analog-to-digital converters (ADCs) are available, for example from Maxim Integrated Circuits (MAX1215) or Analog Devices (AD9626 or AD9630). ADCs with higher sampling rates are available commercially from companies such as Maxim Integrated Circuits or National Semiconductor, and sampling rates in excess of 2 GSPS (giga samples per second) can be purchased off the shelf, with somewhat lower resolution (8-10 bit). Preferably, the sampling rate of the ADC 162 is set to be several times the IF frequency, for example 4-5 times the IF frequency, but techniques known as sub-sampling, where this condition is not met can also be employed within the scope of the present invention. Thus, in the system 160 shown in FIG. 3, two frequencies are used: one to drive the ADC 162 and the other for the IF source 114. Both frequencies can be derived from a common oscillator using one or more phase-locked loops and/or frequency dividers. An alternative approach is to drive the AOM 108 from an arbitrary waveform generator which synthesizes the RF signal to drive the AOM 108 and which itself is synchronized in its clock to the sampling clock 164. The digital data stream thus generated by the ADC 162 may be processed by a processing system on the fly to extract a phase estimate from the incoming data. Alternatively, the data may be stored in a data storage 142 for later processing.

In some embodiments, the phase may extracted from the digital stream by dividing the data stream into short data windows, representative of approximately one resolution cell in the sensing fiber (the windows may be shaped by multiplication by a window function to minimize the leakage in the frequency domain); extracting the signal at the IF frequency from each data window; and calculating the argument of the signal in each window.

This computation can be simplified if there is an integral relationship between the number of data points in the window and the number of cycles of the IF signal in that same window. For example, if the sampling rate is 250 MSamples/s and the IF frequency is 110 MHz, then by choosing the window to be equal to 25 data points, the duration of the window is 100 ns, and this contains exactly 11 cycles of the IF signal. It is then not necessary to carry out a full Fourier transform, but only to extract the desired frequency. In this case, the following sum over a window consisting of Pts points, with a sampling frequency $F_s$ and an IF frequency $f_1$, will provide a complex vector $X_1$ representing the value of the backscatter signal averaged over the length of fiber defined by array Ar. Here, j is the square root of −1.

$$X(Ar) := \sum_{k=0}^{Pts-1} Ar_k \cdot \exp\left(-2 \cdot \pi \cdot j \cdot k \cdot \frac{f_1}{F_s}\right) \cdot \frac{2}{Pts}$$

It is readily recognized that the expression above is equivalent to taking the Fourier transform of the window and then selecting the frequency component $f_1$. The modulus of X is the amplitude of the backscatter signal and its argument is the phase. If a full Fourier transform is used to calculate the complex spectrum, then estimates of the phase are available at a number of frequencies around the nominal values of the IF. The inventors have observed that these neighboring frequencies are all phase related and can thus be used collectively to provide the best estimate of the phase of the backscattered light at the point of interest.

It should be noted that in some embodiments, the spectrum of the backscattered light may be found to be broadened considerably relative to that of the light launched into the fiber. The launched light has a spectrum that is that of the source convolved with the spectrum imposed by the modulation used to generate the pulse (and thus has a spectral width inversely proportional to the pulse duration). However, the spectrum for an individual laser pulse scattered at a particular location can be considerably wider and displaced in its peak from the nominal IF value. The reason for this displacement and broadening of the spectrum is that the intrinsic phase of the backscattered signal is, for a given strain of the fiber and frequency of the optical source, a unique attribute of the section of fiber. It follows that each section of fiber (as determined, for example, by the pulse duration) has a unique and generally different backscattered phase. Therefore as the interrogating pulse travels along the fiber, the phase of the backscatter fluctuates according to the intrinsic phase of the section of fiber that it occupies. This phase fluctuation broadens the spectrum of the scattered light. The degree to which this spectral broadening occurs is inversely proportional to the pulse duration. In heterodyne coherent-detection OTDR, it is desirable for the pulse duration to be at least several cycles of the IF, in order to limit the relative bandwidth of the backscattered spectrum.

It will be recognized that other digital signal processing techniques known to those of skill in the art also can be used to extract the phase of the IF signal.

For instance, in some embodiments, another example of a digital technique for extracting the phase is to calculate the Hilbert transform of the incoming signal, which provides a so-called analytic signal (a complex signal including a real term and an imaginary term). The phase may be calculated directly by forming the arc tangent of the ratio of the imaginary to real parts of the analytic signal.

There are several other techniques that can be used to extract the phase from a digitized intermediate frequency signal.

In some embodiments, the amplitude information from the backscatter signal is still present and can be used to assist the signal processing. The amplitude contains exactly the same information as would be obtained for example from the arrangement of FIG. 1 or from other OTDR systems where only the intensity of the backscattered signal is acquired. The amplitude information is to some extent complementary to the phase information and can be used to supplement the phase data obtained from the main thrust of this disclosure.

As an example, in some applications, such as in seismic acquisition applications, repeated measurements of the backscattered signal under identical conditions are conducted and the results averaged in order to improve the signal-to-noise ratio. Since the frequency of the laser or the condition of the fiber can drift slowly with time, regions where the amplitude was weak (and the signal quality is thus poor) for one acquisition can become regions of strong signal in a later acquisition. The amplitude information can thus be used to provide an indication of signal quality and this indication can then be used to allocate a weighting to the acquired signals. For instance, when averaging successive acquisitions taken under identical conditions, a higher weighting can be allocated to those acquisitions where the amplitude information is indicative of a strong (i.e., high quality) signal, while a lower weighting is allocated to those acquisitions wherein the amplitude information is indicative of a weak (i.e., low quality) signal. In addition to indicating the signal quality of a particular acquisition, the amplitude information can be used to provide an indication of the signal quality at each location along the sensing fiber. Based on these indications, the results obtained from successive acquisitions can be weighted for each location and each acquisition and then combined in a manner that provides an optimized measurement of the desired parameter.

The amplitude information can also be used in other manners to enhance the acquired data. As another example, the amplitude measurement is specific to each location, whereas the phase measurement includes a local element combined with an increasing phase as a function of distance. Thus, if there is a single point of disturbance along the sensing fiber, the disturbance will affect the amplitude only locally at the disturbance point, but the local disturbance will affect all the phases beyond that point. (This is why phase differences are determined to provide an indication of the desired parameter rather than phase information at a particular location.) Thus, examination of the amplitude information in conjunction with the phase information can facilitate distinguishing the effect of a small local perturbation from that of wider disturbance affecting the entire differentiating interval. Consequently, consideration of the amplitude information along with the phase difference can support a more detailed interpretation of the acquired data.

Laser and Clock Phase Noise

In some of the discussed embodiments, the phase measurement relies on comparing the phase of light emitted by the laser essentially at the time of detection with the light scattered at the point of interest (and thus emitted substantially earlier, with a time delay given by approximately 10 µs/km). The coherence of the optical source is thus a greater consideration in some embodiments than in embodiments where the relative phase is determined between two pulses that are launched potentially a short time apart. Although, this problem can be alleviated to some extent by calculating the difference in the phase between separate, but close, regions of the fiber, a poor source coherence causes the phase measured at the IF to move rapidly, creating difficulties in acquiring an accurate estimate of the phase. In particular, if the source exhibits considerable phase noise, phase modulation to amplitude conversion occurs, which gives rise to spectral broadening.

In some embodiments, optical sources having suitable coherency to overcome this problem include distributed feedback fiber lasers, and certain solid-state lasers, such as non-planar ring lasers, and semiconductor distributed feedback lasers (especially if the latter employ additional line-narrowing, such as Pound-Drever-Hall stabilization).

In some embodiments, a Brillouin laser may be used as the optical source. A Brillouin laser is a ring-resonant fiber structure into which a pump light is launched. The output, at the Brillouin frequency (shifted down relative to the pump light by some 11 GHz for typical fibers pumped at 1550 nm), is narrowed through several processes. Improvements of more than one order of magnitude in the source linewidth (relative to the linewidth of the pump) have been reported.

Differential Phase

The phase of the backscatter at each location along the fiber is a random function of the laser frequency and the state of the fiber. Thus the phase of the backscatter varies randomly if a fiber is strained. However if one compares the phase $\Phi_A$ measured at section A, with the phase measured at section B, $\Phi_B$, then the change in the phase difference $\Phi_A - \Phi_B$ is the sum of three components, namely $\Phi_A$, $\Phi_B$ and $\Phi_L$. The $\Phi_A$ and $\Phi_B$ components vary randomly with applied strain, whereas the contribution $\Phi_L$ from the portion between sections A and B is linear with applied strain. It follows that the strain-phase transfer function is not quite linear, but that the linearity improves rapidly as the ratio of the distance A–B divided by the length of individual sections A and B increases. In particular, as the sections A and B are made smaller, the amount of strain that is required to vary their intrinsic phase is increased and therefore reducing the length of these sections aids in improving the linearity, all other parameters being equal. In general, there is a trade-off between the spatial resolution that can be achieved and the linearity, since for a given minimum pulse duration, the larger the differencing interval the better the linearity, but the worse the spatial resolution (it should noted that the signal is also proportional to the duration of the differencing interval, for uniform acoustic fields). Generally, the ratio of the differencing interval to the pulse duration falls in the range of 2 (where there is mainly interest in tracking events) to 10 (where linearity is more important than in simple event tracking applications. It should be understood, however, that other ratios may be used, including higher ratios.

Figure 4:
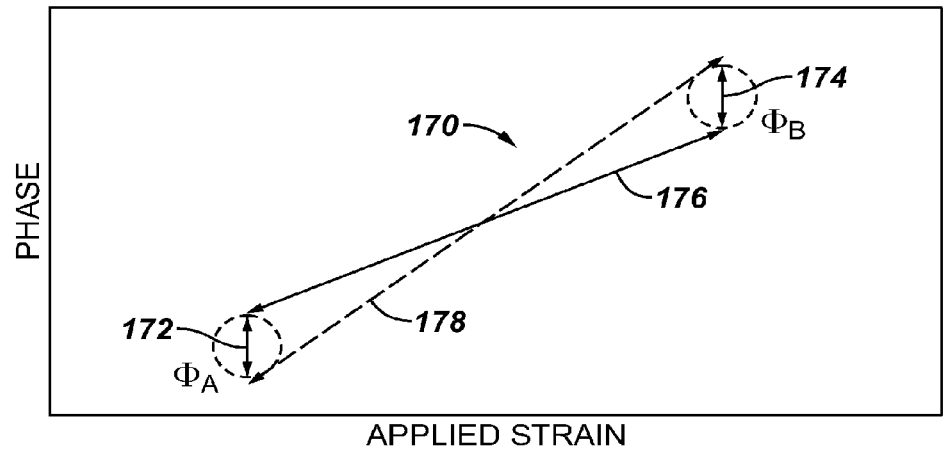
FIG. 4 is a graph of an exemplary phase response of a strained optical fiber.

This situation is illustrated in the graph 170 of FIG. 4 which plots phase on the vertical axis against strain on the horizontal axis to illustrate the phase response of a section of uniformly strained fiber. The double-headed arrows 172 and 174 denote the range of phase that each of sections A and B of the sensing fiber can return. The solid line straight arrow 176 and dashed line straight arrow 178 illustrate the extremes of the possible overall transfer functions that can exist. The phase response of sections A and B is constrained to the region $-\pi$ to $\pi$, whereas the linear phase component $\Phi_L$ has no particular limit. On average, the transfer function will have a slope determined by $\Phi_L$, but this may be distorted by the strain on the ends of the section.

Multiple Frequencies

The characteristic phase of each section A and B is a function of the source frequency, in the same way as the amplitude of the backscatter in these regions is a function of source frequency. Thus, if the measurement were repeated with a different source frequency, then the strain sensitivity of the linear contributions $\Phi_L$ for each of these measurements will be essentially the same, whereas the phase contributions $\Phi_A$ and $\Phi_B$ for the sections will vary randomly. By averaging the differential phase measurement for two or more optical frequencies, the linear contributions for each will add in proportion to the number of frequencies, whereas each of the $\Phi_A$ and $\Phi_B$ contributions remains constrained within a $-2\pi$ to $2\pi$ range and their sum grows only in proportion to the square root of the number of frequencies involved.

Figure 5:
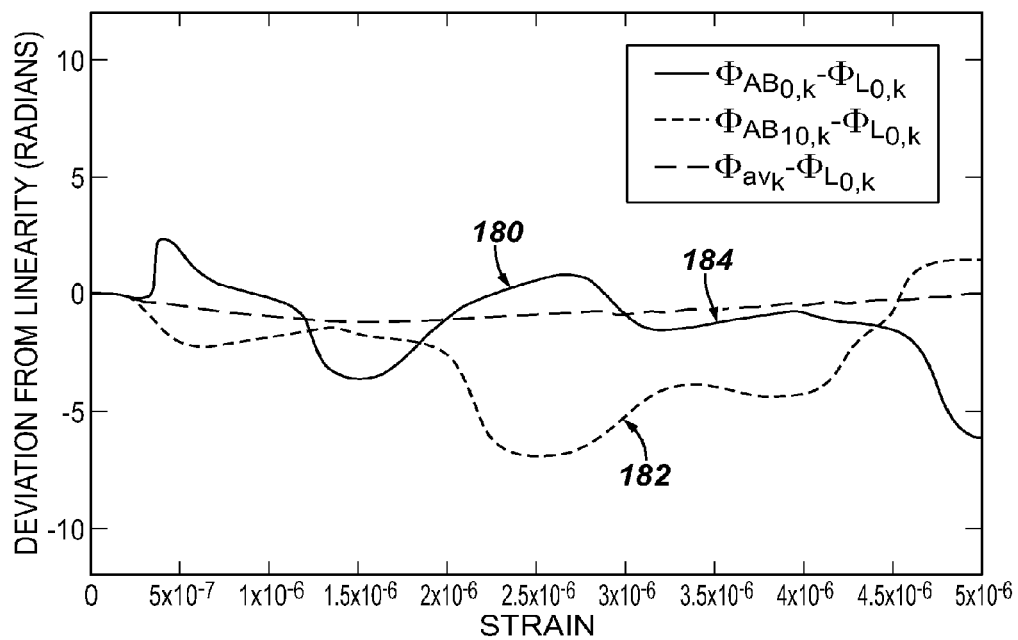
FIG. 5 illustrates modeling of differential phase measurements comparing the responses obtained from single interrogating frequencies with an average response of multiple interrogating frequencies.

As an example of this differential phase technique, FIG. 5 shows the deviation from linearity modeled for a sensing fiber where the pulse duration is 100 ns (equivalent to 10 m of fiber), and the analysis assumes that the zones analyzed are such that the centers of the sections defining each strained zone are also 10 m apart. The simulation covers a strain range of 5µε, which for a pure linear response would result in a maximum phase change of some 74.5 radians for a probe wavelength in the region of 1550 nm. It may be seen in FIG. 5 that the response for single interrogating frequencies (represented by the solid curve 180 and the dotted curve 182) show departures from linearity in the range indicated above. However, the black, broken curve 184 is the average measurement for 20 separate interrogating frequencies. A significant improvement in linearity is observed. Of course, the precise deviation from linearity is a function of the specific arrangement of the microcrystalline structure of the glass forming the specific sections of fiber A and B. While the improvement can only be measured statistically, the deviation is expected to be reduced in proportion to the square root of the number of independent interrogating frequencies available. In order to count as independent, the interrogating frequencies are separated by at least the reciprocal of the pulse duration. In order most efficiently to reduce the non-linearity by averaging the results of multiple interrogation frequencies, the frequency separation is at least this value.

Multi-Resolution and Pulse Separation

If the coherent backscatter signals are acquired along the entire length of the fiber, the data can be processed holistically to improve the strain linearity. As a very simple example, if the strain is found to be localized to a particular region, then the end regions A and B can be selected from the acquired data sets to be separated from the strained zone, such that they are unaffected by the strain. If this can be achieved, the strain measured in the region separating them is perfectly linear.

More generally, the strain can be estimated from a first A-B separation, which will contain some non-linearity. A map of strain thus obtained provides a general indication of a strain/distance function. The phase sensitivity to strain is a random function of position along the fiber and interrogating frequency. However, if the fiber is interrogated at multiple frequencies separated by less than the amount required for independence (as discussed earlier), then a map of sensitivity to strain of the phase for each part of the fiber can be built and used to correct the A and B sections for each part of the fiber and thus improve the accuracy of this first estimated strain distribution.

Figure 6A:
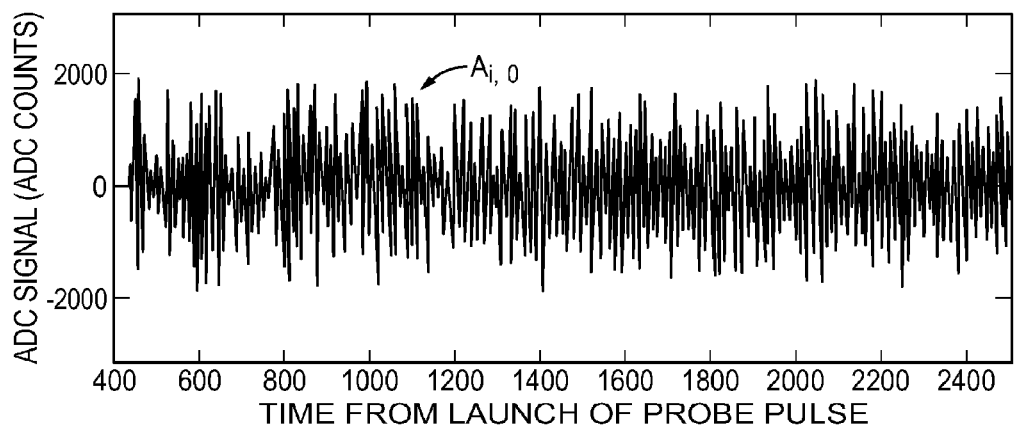
FIG. 6A illustrates a heterodyne coherent Rayleigh backscatter signal returned from an optical fiber in response to a single laser pulse.
Figure 6B:
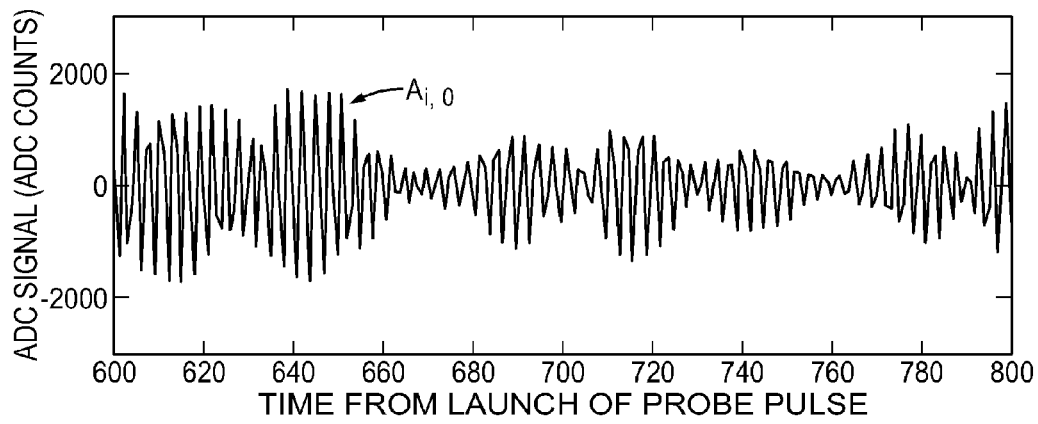
FIG. 6B shows a magnified portion of the signal of FIG. 6A.

As an example, FIG. 6A shows a heterodyne coherent Rayleigh backscatter signal acquired from a single laser pulse. In this case, the pulse duration was about 50 ns, the IF was 100 MHz and the sampling rate was 300 MSPS. FIG. 6B shows a magnified portion of this signal between points 600 and 800, which corresponds to a fiber length of about 66 meters. The phase of the IF is clearly detectable and the envelope can be seen to vary along the fiber.

Figure 6C:
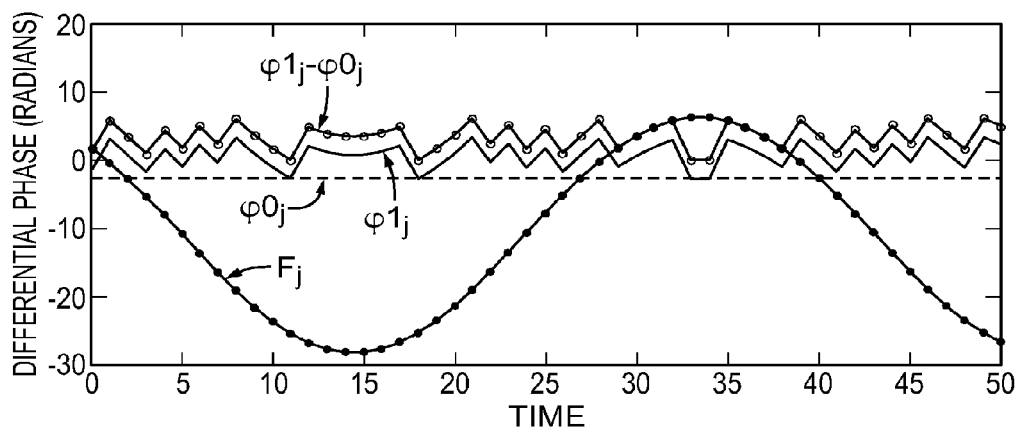
FIG. 6C shows (as a function of time, measured in the number of elapsed laser pulses) the detected phase $\phi_0$ for a sequence of backscattered signals just before a sinusoidal disturbance at a point along the optical fiber tested in FIG. 6A, as well as the phase $\phi_1$ just beyond the region of disturbance, the difference $\phi_1 - \phi_0$ and the unwrapped phase difference.

FIG. 6C shows the detected phase $\phi_0$ for a sequence of backscattered signals (50 laser pulses in this case) just before (line 190) a sinusoidal disturbance at point 705 along the fiber. In this case, the disturbance was centered on point 705, and the phase was estimated in a window centered 60 points (approximately 20 m) upstream from the disturbance. The curve 192 shows the phase estimated after the disturbance for the same laser pulses and thus the same backscatter signals (again 20 m downstream of the disturbance). The curve 194 shows the difference between these phase estimates, as a function of backscatter trace number (which corresponds to time). Finally, the curve 196 shows the unwrapped phase derived from the differential phase (curve 194)

Figure 6D:
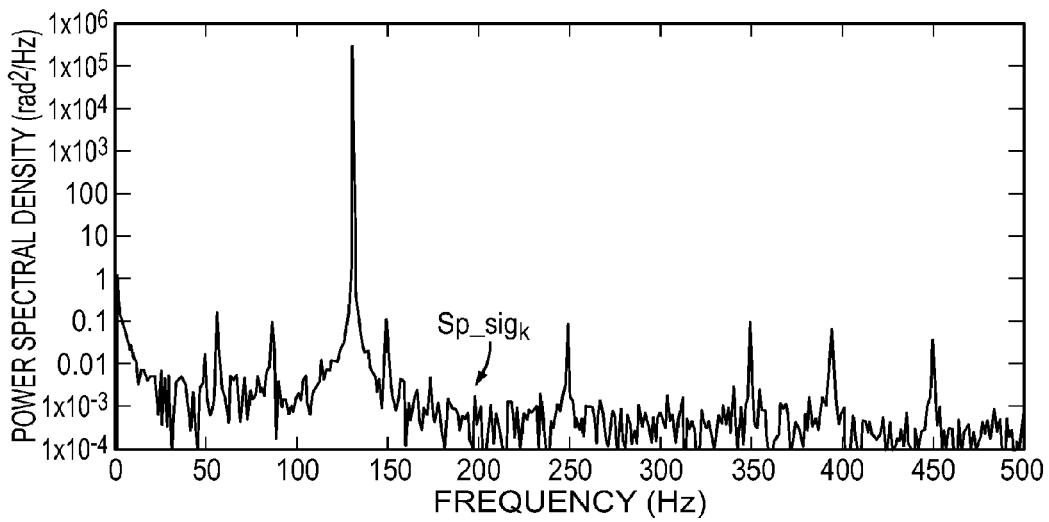
FIG. 6D shows the spectrum derived from the data acquired from backscatter signals returned from the fiber tested in FIG. 6A in response to several thousand pulses, which includes the data of FIG. 6C.

The final figure in the sequence, FIG. 6D, shows the spectrum derived from the above data (several thousand pulses were acquired, rather than just the 50 pulses shown in FIG. 6C for clarity). It can be seen that a very linear signal recovery is achieved, with some 80 dB signal-to-noise ratio and 60 dB above parasitic acoustic sources at 60, 85, 150, 250, 350, 395 and 450 Hz. This demonstrates the capability of the techniques disclosed here to perform high-quality measurements of predictable transfer function.

Homodyne Detection

The embodiments previously described here have shown the case where there is a frequency shift between the local oscillator signal and probe signal. This technique, which is referred to as heterodyne detection, allows the phase to be estimated very simply by comparison of the phase of adjacent time sample points. We now turn to the case where there is no frequency shift between the local oscillator and the probe signals. This is known in the communications literature as homodyne detection. While conceptually simple, this approach brings with it the problem of determining the local phase without reference to nearby sample points. Consequently, the phase must be determined directly, and this can be achieved using an optical 90° hybrid phase detection device. Suitable devices of this type are available commercially from a number of suppliers (such as Optoplex Inc. of Freemont, Calif., USA or Kylia of Paris, France) and can be based on miniaturized bulk-optics, or integrated optics, or indeed on fused taper fiber couplers.

Figure 7:
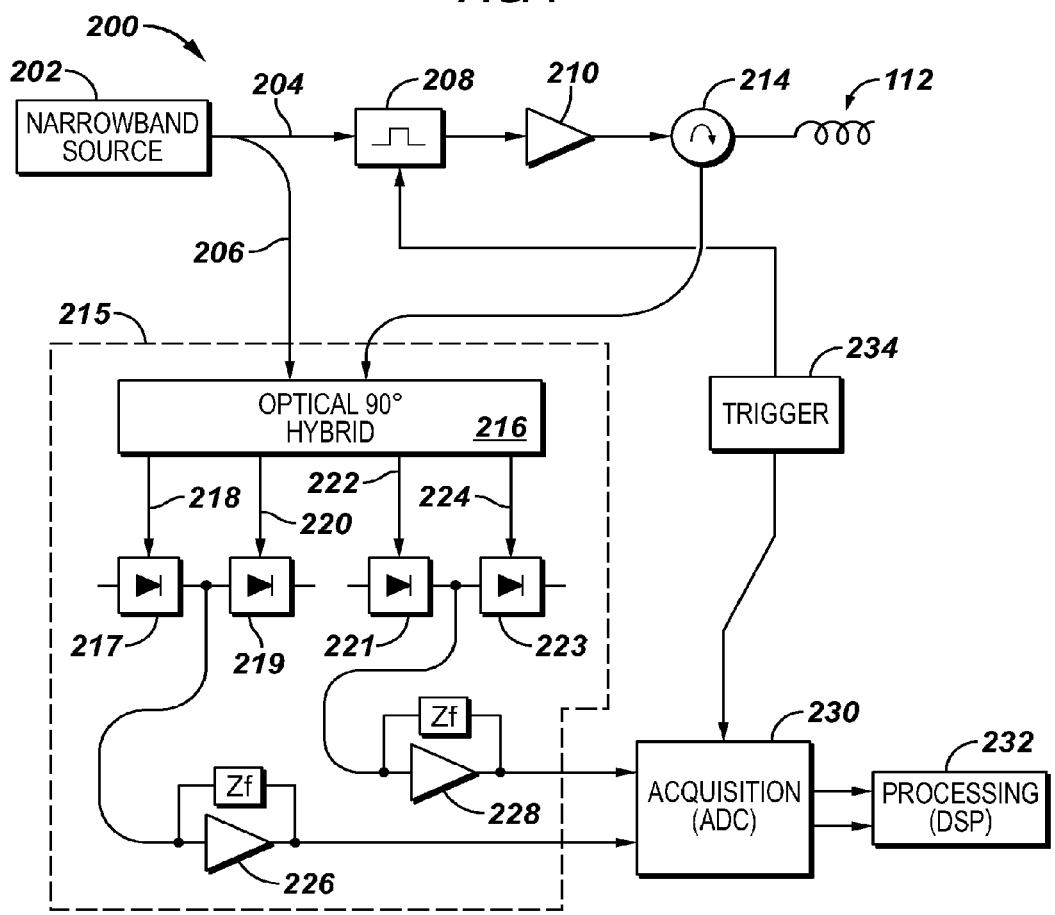
FIG. 7 is a schematic illustration of another exemplary phase coherent-detection OTDR system, in accordance with an embodiment.

Such an embodiment is shown in the system 200 of FIG. 7. System 200 includes a narrowband optical source 202, the output of which is divided between paths 204 and 206. The signal in path 204 is modulated by a modulator 208 to produce a probe pulse, which is amplified by amplifier 210 prior to launching into a sensing fiber 212 through a circulator 214. The backscatter signal returned by the fiber 212 in response to the probe pulse is separated from the forward traveling light by the circulator 214 and provided as an input to a coherent-detection system 215, which includes an optical 90° hybrid phase detection device 216, optical detectors 217, 219, 221, and 223, and receivers 226 and 228. In contrast to the heterodyne case, there is no frequency shift between the probe pulse and the LO.

In general, a 90° optical hybrid device, such as device 216, takes two inputs, namely the local oscillator signal (here, from the path 206) and the signal (in this case the backscatter signal from the circulator 214) and provides at least two outputs that are shifted in phase relative to one another by 90°. Frequently, such as in the embodiment of FIG. 7, four outputs (here, outputs 218, 220, 222, 224) are provided, spaced at 90° on the unit circle, and detected by optical detector pairs 217/219 and 221/223. In such embodiments, the two pairs of outputs from the detector pairs 217/219 and 221/223 separated by 180° may be connected to two balanced receivers (here, receivers 226, 228), which together thus provide a mixed output signal having in-phase (I) and quadrature (Q) components. The benefit of using four outputs fed to two balanced receivers is that common mode noise, e.g. caused by local oscillator intensity fluctuations, is cancelled. Once the two I and Q signal components are available, the phase can be estimated using, for example, a four-quadrant arc-tangent operation on the ratio of Q/I. There are known, efficient algorithms, such as CORDIC (COordinate Rotation Digital Computer), for implementing this function. Thus, as shown in FIG. 7, the outputs of the balanced receivers 226, 228 can be digitized by an acquisition system 230, which provides the digitized data stream to a signal processing device 232, such as a digital signal processing (DSP) chip, a suitably programmed field programmable gate-array (FPGA) or a microprocessor, to perform the arc tangent operation. A trigger signal 234 synchronizes the optical pulse output by modulator 208 and the sampling of the in-phase and quadrature signals from the receivers 226, 228.

However, alternative embodiments also may be used in a homodyne OTDR system. For instance, the two outputs of the hybrid device 216 can be combined in an analog circuit such as the previously mentioned AD8302.

Figure 8:
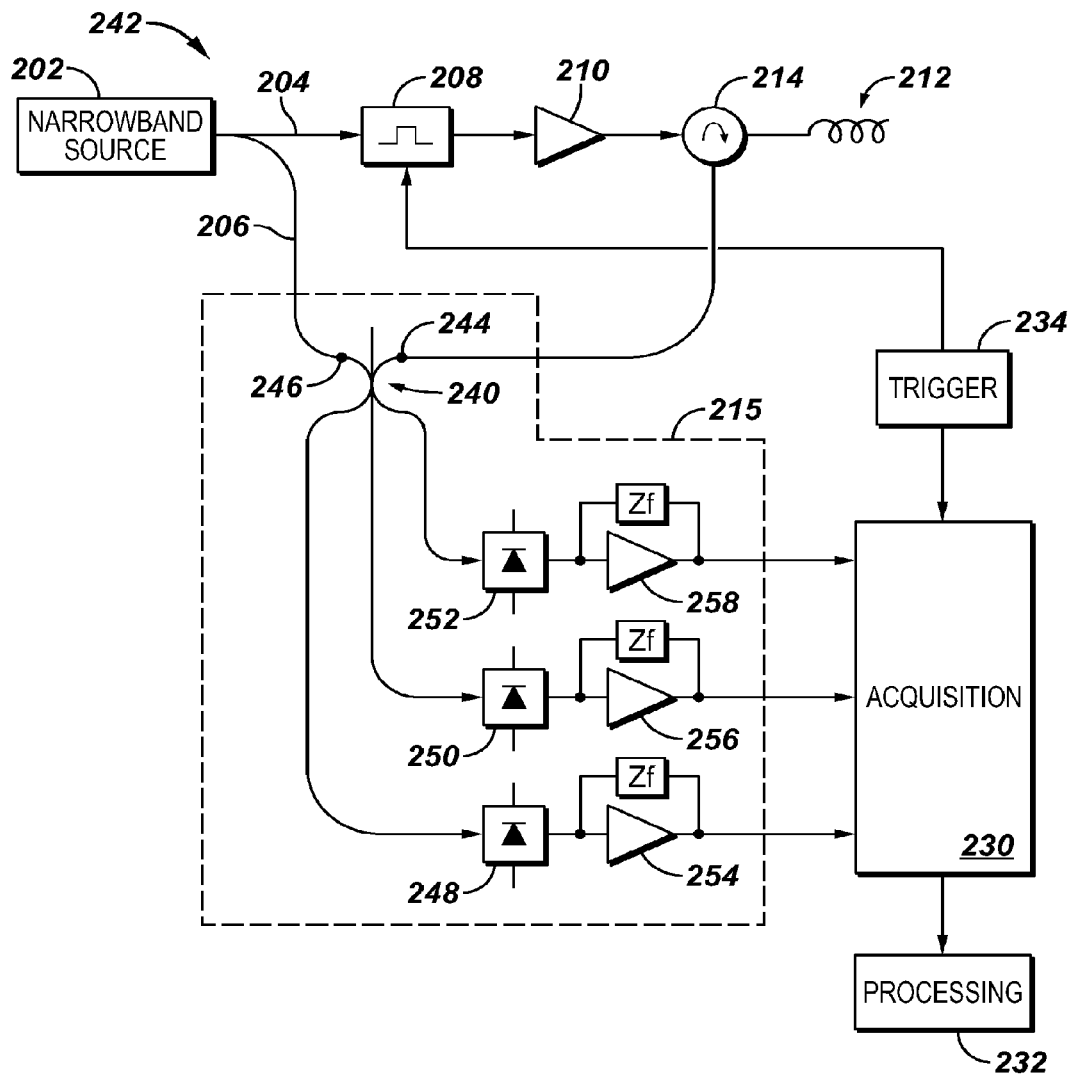
FIG. 8 is a schematic illustration of yet another exemplary phase coherent-detection OTDR system, in accordance with an embodiment.

As another alternative, a number of options can be used to implement the optical 90° hybrid function provided by the device 216. We have already mentioned integrated optic circuits which perform this function. A fused taper coupler is another device capable of providing an approximation to the quadrature signal. A 2×2 coupler provides a pair of outputs that are in anti-phase with respect to one another, so this device cannot help. However, suitable implementations of the coherent-detection system 215 can include a perfectly balanced 3×3 coupler, (such as coupler 240 shown in FIG. 8) which provides outputs that are separated by 120° and can thus provide the desired discrimination. In this case, and as shown in FIG. 8, one of the inputs (e.g., input 242) of the 3×3 coupler is connected to the local oscillator path 206 and another input (e.g, input 244) to the backscatter signal (for example the output port of the circulator 214). If the three outputs of the 3×3 coupler are collected on separate detectors 248, 250 and 252 and receivers 254, 256, 258, then the three components of the resultant mixed output signal can be combined linearly (for example as taught in equations (2) and (3) of L. Mertz, Complex Interferometry. Appl. Opt. 22 (1983) 1530-1534) to provide I and Q outputs that are in quadrature, if the coupler 240 is adequately balanced. In addition, certain unbalanced 3×3 coupler designs provide outputs that are close to quadrature and can also be used in the homodyne coherent-detection OTDR system to detect phase. Ideally, the optical path lengths between the fused coupler and the detectors should be of equal length.

Likewise, couplers having yet more inputs and outputs may (depending on their precise splitting ratios) exhibit phase shifts that are suitable, although the precise phase relationship between the outputs is highly dependent on the coupler fabrication. In the arrangement illustrated in FIG. 8, the coupler 240 is a fused taper type that is made in such a way that all fibers are fused together at the same time: it is the fusion process where the light is mixed and the phase relationships between the different outputs is established. The alternative of using a tree coupler structure would result in a situation where the relative phases are highly dependent of the changes in the length and birefringence of the interconnecting leads.

In another embodiment, an alternative to extracting the phase on separate outputs involves modulating the phase in either the local oscillator path 206 or the pulse generation path 204, such that successive pulses exhibit a relative, known phase shift relative to one another, such as 90°. This method provides a predictable quadrature signal, but requires at least two pulses to be transmitted to calculate the phase at any particular point. As a result, the total volume of data required is no less than if a 90° optical hybrid had been employed (as in FIG. 7) and of course there a risk of the signal changing between laser pulses.

Polarization Discrimination

The coherent detection process is intrinsically polarization-sensitive in that the signal produced is the product of the electric field vectors of the two optical inputs and therefore only that component of the backscattered light that is aligned with the local oscillator signal is detected. The orthogonal component is rejected. However, it is possible to split the incoming backscattered signal into any two orthogonal polarization states and mix each of these with a suitably aligned local oscillator signal. Again, commercially available components are available for this function (for example from Optoplex or Kylia, mentioned above). Using this approach has two distinct benefits. Firstly, this arrangement avoids polarization fading (i.e., the weakening of the signal when the polarizations of the backscatter signal and LO signal are not the same). However it should be noted that with Rayleigh backscatter in silicate glasses, the depolarization of the scattered light ensures that there is always a minimum of approximately 20% of the electric field of the scattered light in the orthogonal polarization state from the strongest, so this issue is not critical. More importantly, in some cases, the two polarizations may carry different information. This is particularly the case when asymmetric influences are applied to the fiber, such as a side force, which tends to act to vary the difference in propagation speed between the two polarization modes of the fiber (i.e. it alters the birefringence of the fiber). This applies to fibers that are nominally circularly symmetric (as are most conventional telecommunications fibers). However, special fibers can exploit the property of a polarization-diverse acquisition system more specifically.

For example, side hole fiber has been proposed and used for a number of years for making pressure measurements. As its name implies, this type of fiber consists of a core with a pair of holes placed symmetrically on either side of this core. This structure responds asymmetrically to isostatic pressure, with the birefringence increasing with increasing pressure. By launching light on both axes of such a fiber, and measuring the differential phase on each axis separately, the effects of axial strain transients (to first order common to both axes) and of isostatic pressure waves (to first order differential to the two axes) can be separated. This leads to several applications in which a side-hole fiber can be employed. For example, if the fiber is closely coupled to an earth formation, a p-wave propagating within the formation will appear as a pressure wave and thus be largely differential between the two optical axes of the fiber. In contrast, an s-wave, polarized along the fiber axis, will apply a mainly axial strain disturbance that can be detected as an essentially common signal on both axes. It is therefore possible to separate these two wave types, which has applications in, for example, seismic monitoring of hydrocarbon reservoirs. Other structures, such as asymmetric micro-structured fibers, have also been shown to produce asymmetric phase changes in response to pressure changes and could thus be used instead of pure side-hole fibers.

Another example of a special fiber that can be used is a high birefringence (HB) fiber. This type of fiber is designed to maintain polarization of light launched on one of the principal axes. There are many designs of such fibers, but one class of HB fiber includes stress-applying rods on either side of the core. These stress applying regions are designed to have a much higher expansion coefficient than that of the rest of the fiber, so an asymmetry is built into the fiber. This produces a large birefringence, which decreases the coupling between the polarization states of the lowest order mode and thus maintains polarization. Similarly to a side hole fiber, the response of an HB fiber to axial stress and to temperature variations is such that by measuring the phase disturbance on each axis separately, the effects of temperature (significant differential component as well as a common component) and strain (largely, but not entirely, common to the two axes) may be separated and thus a disturbance can be ascribed, after calibration of the fiber response, to one or both of a strain or temperature transient. This would allow detected events better to be interpreted. For example, an inflow of gas coming out of solution would be expected to produced a temperature decrease (caused by the Joule-Thomson effect) and possibly such vibration caused by flow noise. In contrast, other events might be purely acoustic or temperature-transient.

Yet another example of a special fiber is a micro-structured fiber, which is a fiber with arrays of holes surrounding the region where the light is guided. Such fibers can be designed to be asymmetric (as mentioned above in the context of pressure sensing) and they also allow the electric field of the guided optical wave to interact with whatever medium is placed in the holes. Typically, this medium is air, but if these holes (or just some of them) are filled with a material that responds, in its refractive index, to an external field, then this field can be sensed by the guided wave. Thus, for example, if the material is electro-optic, its refractive index will change with applied electric field and influence the phase of the light travelling in structure. Likewise, a material that exhibits a refractive index change with applied magnetic field would modulate the phase of the guided light. Although these concepts have been disclosed by others, they have not been applied in the context of an interrogation by coherent Rayleigh backscatter. This approach is particularly suited to long fibers where it is not known where an interaction might take place.

Several of these concepts can be combined for example with a multicore fiber, where a single glass structure can encompass several cores, some with stress-birefringence, others arranged to respond differentially to pressure. While some cross sensitivity is to be expected, as long as the information can be separated (i.e. the data produced is well conditioned such that a transfer matrix from physical inputs to measured phases can be inverted), data on, for instance, pressure, strain and temperature transients can readily be separated.

In some embodiments, the systems and techniques described herein may be employed in conjunction with an intelligent completion system disposed within a well that penetrates a hydrocarbon-bearing earth formation. Portions of the intelligent completion system may be disposed within cased portions of the well, while other portions of the system may be in the uncased, or open hole, portion of the well. The intelligent completion system may comprise one or more of various components or subsystems, which include without limitation: casing, tubing, control lines (electric, fiber optic, or hydraulic), packers (mechanical, sell or chemical), flow control valves, sensors, in flow control devices, hole liners, safety valves, plugs or inline valves, inductive couplers, electric wet connects, hydraulic wet connects, wireless telemetry hubs and modules, and downhole power generating systems. Portions of the systems that are disposed within the well may communicate with systems or sub-systems that are located at the surface. The surface systems or sub-systems in turn may communicate with other surface systems, such as systems that are at locations remote from the well.

Figure 9:
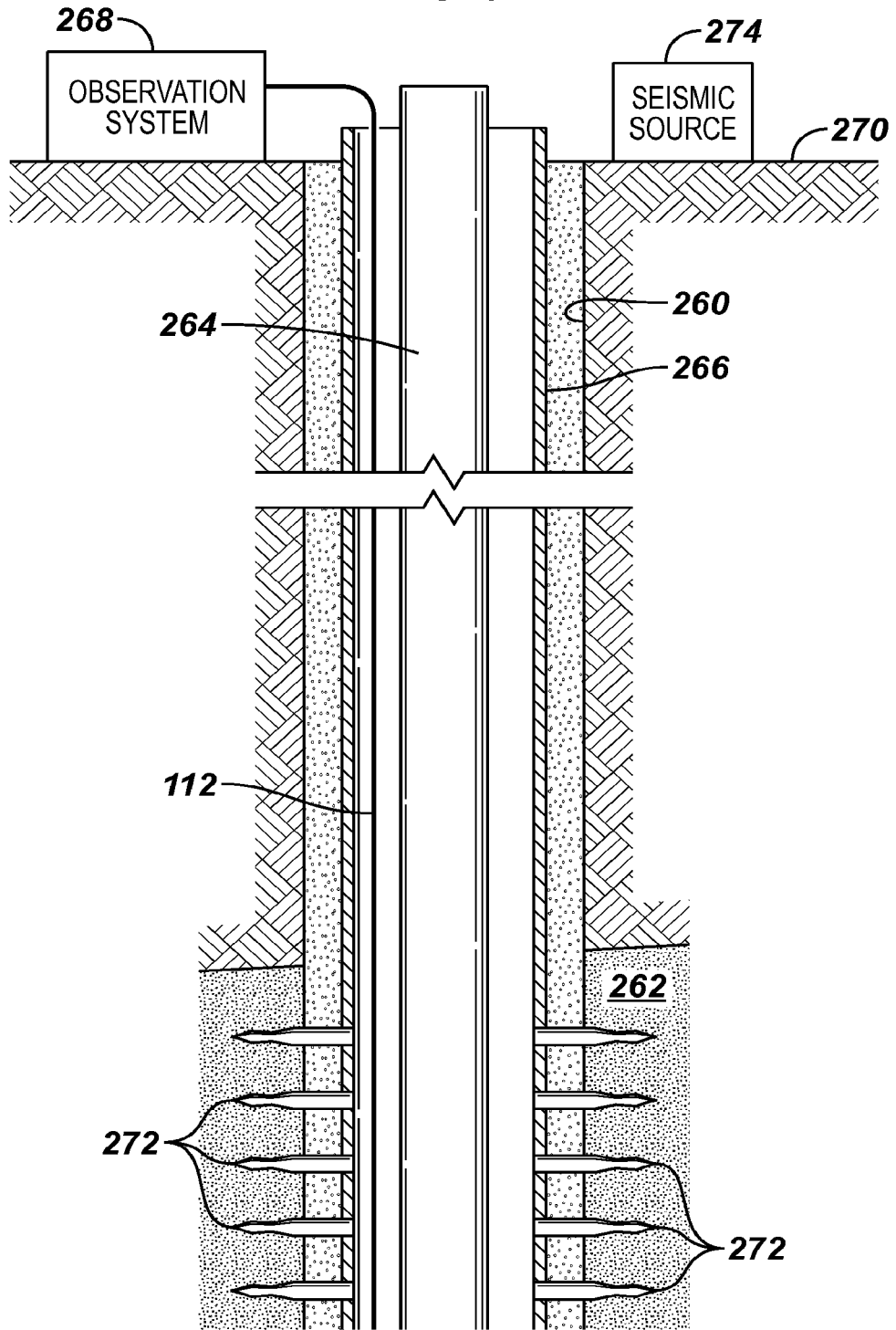
FIG. 9 is a schematic illustration of an exemplary phase coherent-detection OTDR system deployed in a wellbore, in accordance with an embodiment.

For example, as shown in FIG. 9, a fiber optic cable, such as sensing fiber 112, may be deployed in a wellbore 240 to observe physical parameters associated with a region of interest 242. In some embodiments, the sensing fiber 112 may be deployed through a control line and may be positioned in the annulus between a production tubing 244 and a casing 246 as shown. An observation system 248, which includes the interrogation, detection and acquisitions systems for a coherent phase-detection OTDR system (e.g., systems 150, 160, 200, 242), may be located at a surface 250 and coupled to the sensing fiber 112 to transmit the probe pulses, detect returned backscatter signals, and acquire phase information to determine the parameters of interest (e.g., strain, vibration) in the manners described above.

In the embodiment shown in FIG. 9, to reach the region of interest 242, the wellbore 240 is drilled through the surface 250 and the casing 246 is lowered into the wellbore 240. Perforations 252 are created through the casing 246 to establish fluid communication between the wellbore 240 and the formation in the region of interest 242. The production tubing 244 is then installed and set into place such that production of fluids through the tubing 244 can be established. Although a cased well structure is shown, it should be understood that embodiments of the invention are not limited to this illustrative example. Uncased, open hole, gravel packed, deviated, horizontal, multi-lateral, deep sea or terrestrial surface injection and/or production wells (among others) may incorporate a phase coherent-detection OTDR system as described. The fiber optic sensor for the OTDR system may be permanently installed in the well or can be removably deployed in the well, such as for use during remedial operations. In many applications, strain and pressure measurements obtained from the region of interest using a phase coherent-detection OTDR system may provide useful information that may be used to increase productivity. For instance, the measurements may provide an indication of the characteristics of a production fluid, such as flow velocity and fluid composition. This information then can be used to implement various types of actions, such as preventing production from water-producing zones, slowing the flow rate to prevent coning, and controlling the injection profile, so that more oil is produced as opposed to water. The strain and pressure measurements also can provide information regarding the properties of the surrounding formation so that the phase coherent-detection OTDR system can be used in a seismic surveying application.

Towards that end, a phase coherent-detection OTDR system can provide substantial advantages for seismic exploration and seismic production monitoring applications. For instance, seismic surveying applications, and particularly downhole seismic monitoring applications, employ seismic sources (e.g., seismic source 254 in FIG. 9) to generate seismic signals for detection by an acoustic sensor, such as a fiber optic sensor (e.g., fiber 112 in FIG. 9) which is configured to respond to acoustic forces incident along its length and which is deployed downhole (e.g., in wellbore 240 in FIG. 9). Two different types of seismic sources are generally employed: impulsive sources (e.g., air guns, explosives, etc.), which may be either deployed at the surface (as shown in FIG. 9) or downhole in the wellbore, and vibroseis sources. A vibroseis source is generally implemented by one or more trucks or vehicles that move across the surface while shaking the ground with a controlled time/frequency function, which typically is a linearly varying frequency or "chirp." When impulsive sources are used, optical signals captured from a fiber optic sensor during seismic monitoring can be easily cross-correlated with the original acoustic signal incident on the sensor since the firing of the impulsive source is a discrete event. However, for vibroseis sources, the captured signals must be linearly related to the acoustic signals incident on the fiber in order to perform the cross-correlation between the captured signals and the original chirp signal. Because the phase coherent-detection OTDR systems discussed above exhibit a linear and predictable strain/phase transfer function, embodiments of the phase coherent-detection OTDR system are particularly well suited for seismic monitoring applications that generate time-varying acoustic signals, such as chirps. Yet further, because of this linear, predictable relationship between the acoustic signals that impart a strain on the sensor and the resulting optical signal, beam-forming methods can be employed to filter the incoming acoustic waves by angle, thus providing for more precise characterization of the properties of the surrounding geologic formation.

Embodiments of the phase coherent-detection OTDR systems discussed above can also be employed in applications other than hydrocarbon production and seismic or geologic surveying and monitoring. For instance, embodiments of the phase coherent-detection OTDR systems can be implemented in intrusion detection applications or other types of applications where it may be desirable to detect disturbances to a fiber optic cable. As another example, embodiments of the phase coherent-detection OTDR systems can be employed in applications where the fiber optic sensor is deployed proximate an elongate structure, such as a pipeline, to monitor and/or detect disturbances to or leakages from the structure.

While the invention has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A method of detecting a change in a parameter of interest incident along the length of an optical fiber sensor deployed in a region of interest, comprising:
   providing a first optical signal output by a narrowband optical source in a first optical path and a second optical signal output by the narrowband optical source in a second optical path;
   modulating the first optical signal to generate a plurality of probe pulses;
   launching the probe pulses into an optical fiber sensor deployed in a region of interest, the optical fiber sensor configured to respond along its length to a parameter of interest;
   mixing Rayleigh backscatter signals generated by the optical fiber sensor in response to probe pulses with the second optical signal to generate intermediate frequency (IF) signals;
   determining phase of the IF signals at a plurality of locations along the optical fiber sensor; and
   detecting a change in the parameter of interest along the length of the optical fiber sensor based on differences in the determined phases across a selected interval between the plurality of locations.

2. The method as recited in claim 1, wherein the intermediate frequency of each IF signal corresponds to a difference in carrier frequency between the corresponding probe pulse and the second optical signal, and the method further comprises shifting the carrier frequency of the first optical signal by the intermediate frequency prior to launching a probe pulse into the optical fiber sensor.

3. The method as recited in claim 1, wherein the intermediate frequency of each IF signal corresponds to a difference in carrier frequency between the corresponding probe pulse and the second optical signal, and the method further comprises shifting the carrier frequency of the second optical signal by the intermediate frequency.

4. The method as recited in claim 1, wherein determining the phase comprises digitizing the IF signal and sampling the digitized IF signal.

5. The method as recited in claim 1, further comprising:
   for each of a first IF signal corresponding to a first probe pulse and a second IF signal corresponding to a second probe pulse, determining a phase difference across the selected interval; and
   comparing the phase differences to determine the change in the parameter of interest incident on the optical fiber sensor.

6. The method as recited in claim 1, wherein a carrier frequency of a first plurality of the probe pulses is different than a carrier frequency of a second plurality of the probe pulses, and wherein determining the change in the parameter of interest comprises combining the differences in the phase determined from the first plurality of the probe pulses with the differences in the phase determined from the second plurality of the probe pulses.

7. The method as recited in claim 6, further comprising:
   determining amplitude of the IF signals at each of the plurality of locations, and
   further detecting the change in the parameter of interest incident on the optical fiber sensor based on the determined amplitudes.

8. The method as recited in claim 7, wherein further detecting the change comprises determining quality of the IF signals based on the determined amplitudes, and wherein the differences in the phase are combined based on the determined qualities.

9. The method as recited in claim 6, wherein the carrier frequency of the first plurality of the probe pulses is different than the carrier frequency of the second plurality of the probe pulses by at least the reciprocal of the width of a pulse of the first plurality of the probe pulses.

10. The method as recited in claim 1, wherein a carrier frequency of the probe pulses is the same as a carrier frequency of the second optical signal.

11. The method as recited in claim 10, wherein each IF signal includes at least a first component that is not in phase with a second component.

12. The method as recited in claim 1, further comprising deploying the optical fiber sensor in a wellbore formed in the region of interest.

13. The method as recited in claim 12, wherein the parameter of interest is strain, and wherein the characteristic is at least one of a geophysical characteristic associated with the region of interest and a characteristic of a hydrocarbon fluid in the region of interest.

14. The method as recited in claim 12, further comprising:
generating acoustic signals that propagate within the region of interest; and
determining geophysical characteristics of the region of interest based on the detection of the change in the parameter of interest that is incident on the optical fiber sensor as a result of the propagation of the acoustic signals within the region of interest.

15. The method as recited in claim 1, further comprising deploying the optical fiber sensor along the length of an elongate structure.

16. An apparatus, comprising:
a narrowband optical source to output a first portion of an optical signal to a first optical path and a second portion of the optical signal to a second optical path;
a modulator to generate a first probe pulse and a second probe pulse from the first portion of the optical signal to launch into a fiber optic cable deployed in a wellbore formed in a region of interest, the fiber optic cable configured to respond to a parameter of interest incident along its length;
an optical detector to mix a Rayleigh backscatter signal generated by the fiber optic cable in response to each of the first and second probe pulses with the second portion of the optical signal to form a first intermediate frequency (IF) signal corresponding to the first probe pulse and a second IF signal corresponding to the second probe pulse; and
a phase detection and acquisition system to determine a phase difference for each of the first and second IF signals between a plurality of locations along the fiber optic cable, and to compare the phase differences as a function of the locations, wherein the compared phase differences are indicative of changes in the parameter of interest incident on the fiber optic cable.

17. The apparatus as recited in claim 16, the phase detection and acquisition system further to determine locations of the changes of the parameter of interest along the length of the fiber optic cable.

18. The apparatus as recited in claim 16, further comprising an IF source to generate a radio frequency reference signal, wherein the modulator shifts the carrier frequency of first and second probe pulses relative to the second portion of the optical signal by an amount that is proportional to the frequency of the radio frequency reference signal.

19. The apparatus as recited in claim 18, wherein the phase detection and acquisition system determines the phase difference by comparing phase of the first and second IF signals at each of the plurality of locations to the radio frequency reference signal, and calculating the difference in phase between locations.

20. The apparatus as recited in claim 16, wherein the phase detection and acquisition system comprises an analog-to-digital converter to digitize the first and second IF signals.

21. The apparatus as recited in claim 16, wherein a carrier frequency of the first and second probe pulses is the same as a carrier frequency of the second portion of the optical signal.

22. A system to detect a parameter of interest, comprising:
an optical fiber sensor to deploy in a wellbore formed in a region of interest, the optical fiber sensor configured to respond to strain incident along its length;
an optical source to output a first optical signal to provide to the optical fiber sensor;
a coherent detector to mix a Rayleigh backscatter signal generated by the optical fiber in response to the first optical signal with a second optical signal output by the optical source and to generate an output signal from the mixed signals; and
an acquisition system to determine phase differences between locations along the length of the optical fiber sensor based on phase information extracted from the output signal, wherein the phase differences are indicative of strain incident along the length of the optical fiber sensor.

23. The system as recited in claim 22, wherein a carrier frequency of the first optical signal is different than a carrier frequency of the second optical signal, and wherein the output signal has an intermediate frequency corresponding to the difference in carrier frequencies of the first and second optical signals.

24. The system as recited in claim 22, wherein the coherent detector is a homodyne detector.

25. The system as recited in claim 22, further comprising an acoustic source to generate acoustic signals that propagate through the region of interest, and wherein the phase differences are indicative of strain incident along the length of the optical fiber sensor as a result of the propagation of the acoustic signals.

26. The system as recited in claim 25, the acquisition system further to determine a location of the strain incident along the length of the fiber optic sensor as a result of the propagation of the acoustic signals.

27. A method of detecting a parameter of interest incident along the length of a distributed fiber optic sensor, comprising:
launching a plurality of probe pulses generated by an optical source into a distributed fiber optic sensor configured to respond along its length to a parameter of interest that is incident thereon;
mixing Rayleigh backscatter signals generated by the distributed fiber optic sensor in response to the probe pulses with an optical signal generated by the optical source to generate mixed output signals, wherein each mixed output signal corresponds to a particular one of the probe pulses;
for each mixed output signal, determining phase differentials between locations along the distributed fiber optic sensor; and
comparing the phase differentials determined for a first mixed output signal with the phase differentials determined for a second mixed output signal as a function of location to detect a change in the parameter of interest along the length of the fiber optic sensor.

28. An optical time domain reflectometry system, comprising:
a distributed fiber optic sensor deployed in a region of interest, the distributed fiber optic sensor configured to respond along its length to a parameter of interest;
a coherent optical source to output a first portion of an optical signal to a first optical path and a second portion of the optical signal to a second optical path;

a modulator in the first optical path to generate a plurality of probe pulses from the first portion of the optical signal to launch into the distributed fiber optic sensor;

a coherent detection system to mix Rayleigh backscatter signals generated by the distributed fiber optic sensor in response to the probe pulses with the second portion of the optical signal to generate mixed output signals, each mixed output signal corresponding to a particular one of the probe pulses; and a phase detection and acquisition system to determine, for each mixed output signal, a phase differential between first and second locations along the length of the distributed fiber optic sensor, and to compare the determined phase differentials to determine a change in the parameter of interest between the first and second locations.

* * * * *